United States Patent [19]

Bjäreklint et al.

[11] Patent Number: 4,692,229
[45] Date of Patent: Sep. 8, 1987

[54] ELECTRODE CHAMBER UNIT FOR AN ELECTRO-CHEMICAL CELL HAVING A POROUS PERCOLATION ELECTRODE

[75] Inventors: Åke Bjäreklint, Vallentuna; Daniel Simonsson, Täby, both of Sweden

[73] Assignee: ElectroCell AB, Åkersberga, Sweden

[21] Appl. No.: 621,101

[22] Filed: Jun. 15, 1984

[30] Foreign Application Priority Data

Jun. 17, 1983 [SE] Sweden .............................. 8303494

[51] Int. Cl.$^4$ ........................... C02F 1/46; C25B 9/00; C25B 11/03; C25B 11/12
[52] U.S. Cl. .................................... 204/151; 204/257; 204/279; 204/283
[58] Field of Search ............... 204/282, 283, 279, 255, 204/256–258, 263, 294, 275, 149, 151, 280

[56] References Cited

U.S. PATENT DOCUMENTS

| | | | |
|---|---|---|---|
| 1,231,967 | 7/1917 | Tainton et al. ....................... | 204/283 |
| 1,239,443 | 9/1917 | Antisell ............................ | 204/283 X |
| 3,236,760 | 2/1966 | Messner .......................... | 204/254 X |
| 3,457,152 | 7/1969 | Maloney, Jr. et al. .......... | 204/280 X |
| 3,748,238 | 7/1973 | Heit et al. ....................... | 204/280 X |
| 3,954,594 | 5/1976 | Recht ............................. | 204/283 X |
| 4,226,685 | 10/1980 | Portal et al. ..................... | 204/283 X |
| 4,292,160 | 9/1981 | Marcantonio .................. | 204/254 X |
| 4,308,122 | 12/1981 | Das Gupta et al. ................ | 204/257 |
| 4,326,938 | 4/1982 | Das Gupta et al. ................ | 204/228 |
| 4,357,224 | 11/1982 | Hardman et al. ................... | 204/255 |
| 4,367,132 | 1/1983 | Bell et al. ....................... | 204/151 X |
| 4,430,176 | 2/1984 | Davidson ......................... | 204/284 X |
| 4,445,990 | 5/1984 | Kim et al. ....................... | 204/151 |
| 4,564,432 | 1/1986 | Nagai et al. ..................... | 204/257 X |
| 4,569,747 | 2/1986 | Kedem et al. .................... | 204/257 X |
| 4,585,539 | 4/1986 | Edson ............................ | 204/257 X |

FOREIGN PATENT DOCUMENTS

| | | |
|---|---|---|
| 2948579 | 6/1980 | Fed. Rep. of Germany . |
| 2363642 | 3/1978 | France .............................. 204/252 |
| 2043692 | 10/1980 | United Kingdom . |
| 1578811 | 11/1980 | United Kingdom |

OTHER PUBLICATIONS

European Search Report of EP 84850183.

Primary Examiner—Donald R. Valentine
Attorney, Agent, or Firm—Burns, Doane, Swecker & Mathis

[57] ABSTRACT

An electrode chamber unit intended for use in an electrochemical cell including at least one porous percolating electrode in the form of a bed of electrically conductive particles, e.g. of graphite. The unit is distinguished in that it includes at least one substantially flat frame (3), preferably of a polymeric material, said frame defining a central opening (4) which is filled with the electrically conductive particles so as to form a porous bed (5), the particles being kept in place in the central opening of the frame by sufficiently dense separators (10), preferably made from a polymer material, which are arranged to cover the central opening on either side of the frame to form an electrode chamber, that the frame is provided with at least one hole (8) for supply and at least one hole (9) for discharge of electrolyte, where said holes are in communication via supply and discharge channels with the central opening of the frame, and that the frame includes current conductors (6,7) for supplying electric current to the conductive particles.

An electrochemical cell including the above-mentioned units.

A method of producing the cell by placing a separator (13) horizontally, applying at least one frame (3) on top of the separator, filling the central opening (4) of the frame with the particles of the electrically conductive material, placing the next separator (10) thereupon so as to keep the particles in place and repeating the procedure with the number of electrode chamber units which are to be included in the electrochemical cell, and locking the units to each other with conventional locking means (15,16).

Use of the cell for purification of water.

21 Claims, 4 Drawing Figures

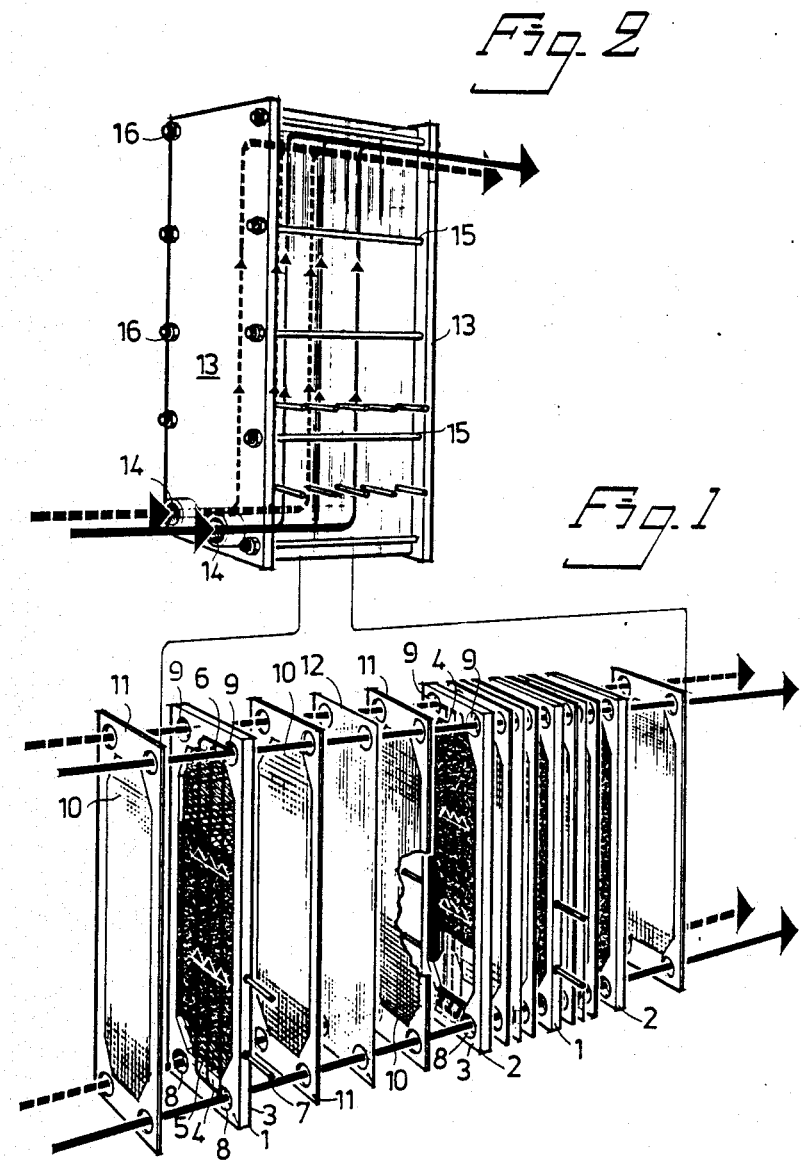

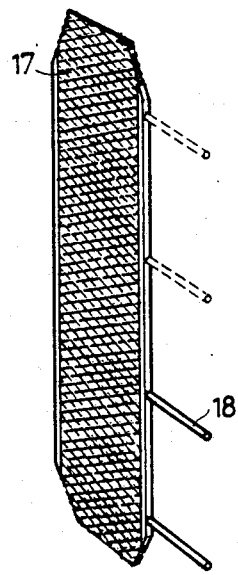
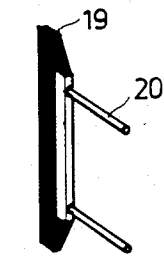

ELECTRODE CHAMBER UNIT FOR AN ELECTRO-CHEMICAL CELL HAVING A POROUS PERCOLATION ELECTRODE

TECHNICAL FIELD

The present invention relates to the field of electrochemical cells, particularly electrolytic cells, which contain at least one porous percolation electrode in the form of a bed of electrically conductive particles. More specifically the invention relates to an entirely new structure of an electrode in the form of a bed of conductive grains, or rather to a complete electrode chamber unit which can very easily be assembled into an electrochemical cell of the filter press configuration. By this, the invention can be considered representing a pioneer invention within the field of electrodes in the form of beds of conductive grains, as, according to the invention, it is simple to construct electrochemical cells with the desired number of electrodes, with the desired thickness of the respective electrodes, with counter electrodes with the same structure as the electrodes according to the invention or counter electrodes of another type, e.g. solid plates etc., which in turn enables a simple disassembling of the cell, exchange or regeneration of individual electrodes, adjustment of cell structure and size to the intended field of use etc.

The invention further relates to an electrochemical cell including the above-mentioned electrode chamber units, to a method of producing such an electrochemical cell and to the use of said cell for cleaning different kinds of contaminated waters.

BACKGROUND OF THE INVENTION

The discharge of heavy metals in different wastewaters contaminates the surface water and disturbs the biological purification processes in municipal sewage plants. The dominating purification technique currently used is chemical precipitation of the metals as hydroxides. Hydroxide sludge is obtained as a final product, which results in transport and deposition costs. Metal ions have been replaced by sodium or calcium ions in the wastewater, which further means that this salt-bearing water cannot be returned to the process.

The ideal method of purifying wastewaters containing heavy metals would be a precipitation of the metals in a pure form with simultaneous desalination of the water to a purity allowing recycling in the process. The present invention enables an electrolytic metal precipitation which gives these advantages. Electrolytic metal precipitation from diluted solutions has previously not come into industrial use, due to the fact that conventional electrolysis with planar electrodes requires too large electrode areas to give a satisfactory purification effect, with the low final contents which are required these days (approximately 1 ppm). Under these conditions the electrolysis process is controlled by the transport of metal ions to the electrode surface (the cathode). To achieve a high material transport rate per volumetric unit, and thereby a small reactor volume, the cathode can instead be formed in accordance with the invention as a percolated porous body or a stable particulate bed with a high specific area.

The basis principle of using beds of conductive grains as electrodes to obtain high specific areas is indeed described in the literature. In this connection reference is made to e.g. DOS No. 2,022,497, DOS No. 2,904,539, U.S. Pat. Nos. 3,974,049, 3,859,195, 3,459,646, 3,647,653 and 3,650,925 and DE Nos. 2,424,001, 2,620,702, 2,705,007 and 2,723,708 and U.S. Pat. Nos. 4,123,340 and 4,217,191 and SE No. 413,446. However, none of these more or less sophisticated structures should be particularly suitable for industrial application with the severe requirements now made on wastewaters, and the structures are furthermore so fixed in their constructions that they cannot be adapted or modified simply and easily to different applications or conditions as is the case with the electrodes in accordance with the present invention.

Cell structures of the filter press type are indeed also known, reference e.g. being made to U.S. Pat. No. 4,274,939, but in these cases the electrodes are of a completely different structure, viz. in the form of solid plates, which structure cannot possibly be compared with the beds of conductive grains which have so far been used within the field of porous percolation electrodes. Other examples of frames with solid electrodes are those disclosed in DE No. 3,221,371 A1 and SU No. 619,551.

Thus, the art of using a bed of conductive grains as a percolation electrode must be considered specifically distinct from the art of using planar electrodes. Frames with planar electrodes have been known for a long time but as far as we know nobody has ever now the idea of utilizing percolation beds of distinct grains in frames or even less solved the problem of accomplishing this in a useful way. The present invention relates to an electrode chamber unit which solves the specific and different problems associated with a particulate electrode having good purification capacity. For instance, such a structure is extremely sensitive to so called channel-formation. Apart from the fact that the unit according to the invention does not comprise outer and inner frames as in U.S. Pat. No. 4,274,939, the grid structure and scaling properties of the frames used in said U.S. patent would not enable the provision of a unit in accordance with the present invention. The extremely high degrees of purification that have been obtained (up to 99.99%; cf. the Examples) represent a major advantage of the unit according to the invention, especially in the light of the great versatility of the invention as compared to previously known beds of conducting grains, and are not obtainable by the known frames.

The present invention has thus been found particularly usable in conjunction with the purification of wastewaters, e.g. washing water from the galvanizing industry, or mine water, but the new electrode chamber units and cells are by no means limited to just this use, but one of the great advantages of the invention is just that electrochemical cells can be tailored for practically any kind of electrochemical reaction of the electrolysis type.

A flexible, universally usable cell must meet other demands than those met by cells having beds of conductive grains. In common there is the demand on small electrode distances and the desirability of some form of package principle. However, the electrodes must be easily exchangeable, since different processes require different electrode materials. Furthermore, the cell must also be designed in a material that withstands corrosion in as many conceivable electrolytes as possible. It is also known that many metals disturb the electrode processes and cause poisoning of the electrodes. It would therefore be desirable with a cell in an inert plastics material. If the components of the cell can be injection moulded, the precision required for proper sealing can be achieved. Furthermore the price can be kept low if the series are reasonably long. Injection moulding requires, however, that the number of differently shaped parts can be kept down.

All this is enabled by the new electrode chamber unit in accordance with the present invention.

DISCLOSURE OF INVENTION

The electrode chamber unit in accordance with the invention is distinguished in that it includes at least one substantially flat or planar frame defining a central opening which is filled with the electrically conductive particles to the formation of a porous bed, the particles being kept in place and insulated electrically from the counter electrodes with the aid of sufficiently dense separators, which are arranged to cover the central opening on either side of the frame to form an electrode chamber, that the frame is provided with at least one hole for feed of and at least one hole for discharge of electrolyte, said holes being in communication via respective inlet and outlet channels with the central opening of the frame, and that the frame includes conductors for supplying electric current to the conductive particles.

By the expression "at least one frame" it is to be understood in the present case that an alternative to a thick frame is two or more thinner frames, which make it possible to work with one and the same frame thickness but still vary the thickness of the electrode. In such a case the frames are placed against each other and can be regarded in relation to the remaining components of the electrode chamber unit as a single cohesive frame, the term "frame" being used for the sake of simplicity even in the cases where two or more frames are used in one and the same electrode.

However, both the frame and the separators are preferably made in a polymeric material, thus enabling the achievement of the above-mentioned advantages, particularly if this polymeric material is a thermoplastic, injection mouldable material. The material for the frame and the separators respectively does not necessarily need to be the same polymeric material. Thus, polyethylene and polypropylene can be mentioned as examples of suitable materials for the frame, whereas the separator, if made from another material than the frame, can be moulded e.g. from polyamide or polyester. In this connection it can also be mentioned that in the applications requiring ion-selective diaphragms, these diaphragms can also function as separators. Thus, in this case the diaphragm has a double function. Separate diaphragms can be used of course, which is illustrated more closely below.

Since one and the same frame of the electrode chamber unit in accordance with the invention contains holes for the feed as well as holes for the discharge of electrolyte, an electrochemical cell made up from the electrode chamber units will function in a way where the electric current and electrolyte flow are directed in a cross-flow pattern in relation to each other, which has been found to give considerably better performance than in those cases where the electric current and electrolyte flow are directed in a concurrent or countercurrent flow in relation to each other.

The central opening of the frame, and thereby the electrode bed, can be given different configurations, but it has been found that particularly favourable flow conditions and performances are achieved if the central opening has a substantially rectangular shape. The ratio longside:shortside of the rectangle is suitably at least 2:1 and preferably at least 4:1, a particularly favourable range being 4:1–10:1. Furthermore, if the channels for feed and discharge of electrolyte to and from the central opening open out in the respective shortside of the rectangle, i.e. at opposing shortsides, advantageous conditions for the electrolysis are achieved.

Particularly in the case of metal recovery from diluted solutions, there is a requirement for low ohmic losses and the avoidance of secondary reactions, apart from the requirement of a large electrode surface per unit of volume and good material transfer, which are met by the electrode chamber unit in accordance with the invention. In turn, this means that the thickness of the electrode frame, and thereby of the electrode, should be kept comparatively small compared with the length and width, respectively, of the frame. In absolute numbers this more specifically means that the frame preferably has a thickness within the range of 0.2–5 cm, more preferably 0.5–2 cm and most preferably 0.5–1 cm. By the structure of the new units in accordance with the invention, as well as the opportunity of assembling electrochemical cells with the desired capacities by assembling a desired number of frames, the small bed thickness does not involve any disadvantage in relation to the known art, but instead the advantage that the electrolysis conditions can be optimized in a way which has not been possible previously within the field of beds having conductive grains, which in turn opens possibilities for new fields of applications for electrodes of this kind.

With regard to the electrode material, the requirements of the particulate electrode are the following: a good electrical conductor, chemically inert, usable both as a cathode and an anode and cheapness. The material which presently has shown to meet these demands in the best way is graphite, which is thus the preferred material for the conductive particles, but the invention is of course not limited to the use of this material only, since the idea is applicable to all other materials with similar properties.

The size of the electrically conductive particles is easily determined by one skilled in the art for each individual case, depending on the particular conditions applying to the application in question. In general, however, the risk of channel formations and the requirement of reasonable pressure drops contradict too small particles or grains in the bed. A balance must be struck with the requirement of high specific area, which grows inversely proportional to the particle size. A usable range for particle size is, however, 0.5–5 mm, preferably 1–2 mm. Furthermore, the best purification conditions have been found to occur when the particles have an irregular shape, this being often preferable to a homogeneous spherical shape.

An important demand on the electrode chamber units is that they give good mutual sealing in the electrochemical cell in which they are incorporated. For this reason the frame should preferably be surrounded on either side by a separate gasket, which is suitably a planar or flat gasket. Apart from its purely sealing function, the gasket can also have the function of regulating the packing density of the bed of the electrically conductive particles. This means that the gasket is preferably manufactured from a soft or elastic material, e.g. rubber, which can be compressed, or allowed to expand, respectively, in response to how tightly it is required to pack the bed.

To enable the cell to operate as a continuous concentrator, where large volumes of low-concentrated waste solution are refined into small volumes of highly concentrated metal solution, there is further required in this special application dense and effective ion-selective diaphragms, i.e. in this case anion-selective diaphragms. In order that this diaphragm will not be punctured by the particles in the bed it is suitably disposed such that it is protected by the separator. In accordance with a preferable embodiment this is done by selecting as the separator a net or fabric or cloth material, preferably a polymeric material which surrounds the diaphragm on both sides. The separator net or fabric must be so dense as to protect the diaphragm from said puncturing by the electrically conductive particles, while at the same time not being so dense as to disturb the electrolytic current.

Current supply via the frame is required to the electrically conductive particle bed. The current conductors can be implemented in a number of different ways, most important being that they do not disturb the electrolyte flow through the bed to any appreciable extent. One embodiment of current supplier which has been found to fulfil this requirement is one in the form of a substantially flat tongue arranged in the bed of conductive particles, the tongue being connectable to a current source via bar-like elements, preferably of a substantially circular cross-section which are inserted through the peripheral edge of the frame. It has been found that the tongue should be thrust a distance into the bed, i.e. with a space to the edge of the central opening of the frame, whereby the electrolyte flow is disturbed as little as possible. A particularly preferred combination of materials in this case is a graphite tongue with rodlike elements of titanium. Another embodiment of current conductor which has also been found effective is a large-mesh metal net, e.g. expanded metal of titanium, arranged inside the bed, its dimensions being similar to or smaller than the dimensions of the central opening of the frame.

However, many other configurations of the current conductor are possible, as was mentioned above. A variant means that there are no separate current supplying means, the current supply function being provided by the frame per se, namely by the frame consisting of a composite material with a metallic conductor as a core in the frame.

For the feed of electrolyte from the holes of the frame to its central opening there is at least one channel. In accordance with a preferable embodiment of the invention, this channel includes an arrangement enabling the electrolyte to be distributed over the entire width of the central opening of the frame, so that the electrolyte flow will be uniform over the entire bed. According to a variant, the arrangement includes several smaller channels, but other embodiments of such distribution or throttling arrangements are conceivable. In the corresponding way, the channel for discharge of electrolyte from the particle bed is suitably provided with similar distribution means.

Another particularly preferable embodiment of the electrode chamber unit in accordance with the invention is represented by the case where the frame has two holes for the inlet and two holes for the discharge of electrolyte with separate channels from both holes to the central opening. If these channels are arranged to open out on opposite sides of the central opening, this means that one and the same frame is usable both as an anode and a cathode in the cell, by rotating the anode or cathode frames by 180° in relation to each other. The thickness of each electrode can be varied discretely by several frames with the same orientations and without intermediate separators being assembled into a common thicker electrode frame. This makes an extremely valuable contribution to the art in this field, since production costs can be kept low as in such a case the injection moulding can be carried out by means of one and the same tool.

The invention further relates to an electrochemical cell, which includes or is constructed solely from the above-described electrode chamber units. The electrochemical cell in accordance with the invention is thus constructed according to the filter press principle with electrodes being arranged in central openings in frames provided with holes for inlet and discharge of electrolyte respectively to and from the electrode. At least one kind of electrode (anode or cathode) consequently consists of porous percolating electrodes in accordance with the invention, while the counter electrodes can be solid or sintered plates arranged in similar or identical frames.

In the cases where the anodes as well as the cathodes are to be porous percolation electrodes, the electrode chamber units mentioned above, which have two holes for inlet and two holes for discharge of electrolyte are suitably used, the frames being turned 180° in relation to each other.

In the electrochemical cell according to the invention the shortside of the central opening, in the case where the central opening is a rectangle, is arranged along a horisontal plane. By this the electrolyte flow will be directed upwardly or downwardly in the vertical plane.

It will be seen from the above that the expression "electrochemical cell" is used in a broad sense, i.e. not in the sense of a single cell with only one anode and one cathode, but a cell with the desired number of anodes and cathodes. Synonymous expressions in conjunction with the present invention are thus "electrochemical reactor" or "electrolysis apparatus".

The term "separator" in the present case also intends to convey a broad meaning which means that the separator is not necessarily arranged between two electrodes, but ultimately it may also constitute the end plate of the cell and "separate" the outermost electrode from the surroundings.

According to another aspect of the present invention, a method is provided for producing or assembling the electrochemical cell described above. Distinguishing for this method is that a separator is placed horizontally, the first separator according to the definition above usually consisting of the end plate of the cell, that at least one frame is placed on top of the separator; that the central opening of the frame is filled with the particles of the electrically conductive material; that the next separator is placed thereupon so as to keep the particles in place; and then optionally an ion-selective diaphragm or membrane; and on top thereof another separator, and that the procedure is repeated with the number of electrode chamber units which are to be included in the electrochemical cell, the units then being locked together with conventional locking or clamping means.

In agreement with what has been discussed above, gaskets of an elastic material, e.g., rubber, are used between the frames in accordance with a preferred embodiment of the method, the central opening being filled with the conductive particles up to the edge of the gasket, and the gaskets being compressed to obtain the desired packing density for the conductive particles. This compression, together with the abovementioned locking, can e.g. be made with through-going metal rods with screwed ends for nuts. Another example of the clamping devices are so-called snap-on means, by which the plastic frames can be connected to each other, although these means can be more difficult to implement as compression arrangements.

The invention further relates to a special use of the electrochemical cell in accordance with the invention, namely for the purification of wastewaters, particularly for the processing of water contaminated by heavy metals.

However, the invention is by no means limited to this particular use, one of the great advantages of the invention being instead the new possibilities of tailoring an electrochemical cell for practically every type of electrochemical reaction. Other examples of fields of uses will be illustrated below and can moreover be easily worked out by one skilled in the art. The size of the cell can be simply adjusted to the needs by selection of a suitable number of frames, where each frame is built up for a given capacity. To increase the total reliability and reduce the risks of leackage it may be advisable not to make the individual modules too large. The desired size of the plant can be obtained instead by a connection in parallel of several modules or by a connection in series of parallel modules. Among further advantages in this connection there can be mentioned doubled electrolyte speed in the electrodes for the same total residence time in the system, which gives an improved material transport, and that the lower current loading in the second step means that the electrode thickness can be increased and the total diaphragm area thereby decreased. The electrode thickness can be increased in discrete steps by putting together several frames for each electrode.

DRAWINGS

The invention will now be disclosed more in detail with reference to the accompanying drawings, on which FIG. 1 is a so-called exploded view of an electrochemical cell in accordance with the invention, constructed according to the filter press principle and containing an embodiment of the electrode chamber unit in accordance with the invention;

FIG. 2 illustrates the cell of FIG. 1 in the assembled condition;

FIG. 3 illustrates an embodiment of a current conductor intended for use in the electrode chamber unit in accordance with the invention; and FIG. 4 illustrates another embodiment of a current conductor for use in the electrode chamber unit in accordance with the invention.

The cell illustrated by an exploded view in FIG. 1 contains a number of cathodes 1 and anodes 2, which are of the same principle structures and which are thus both representatives of the new inventive idea in accordance of the invention. The electrode as well as the counter electrode are built up from a frame 3 with a rectangular form defining a central opening 4, which is also of a substantially rectangular shape, although the rectangle has oblique corners for providing a more homogeneous electrolyte flow across the electrode. The central opening 4 is filled with a porous bed 5 of electrically conductive particles. This bed 5 covers substantially the entire opening 4, but for the sake of clarity only part thereof is shown in the Figure. The reason for this is that the Figure also shows the current conductor 6. In the illustrated case this conductor 6 is an expanded metal net embedded in the particle bed 5. Rod-like members 7 futhermore project via the edge of the frame 3 for supply of current to the metal net 6. In the illustrated embodiment, the elements 7 from the cathodes are directed towards the viewer, while the corresponding elements from the anodes are not visible but are directed in the opposite direction, so that it will be simpler to keep apart the current conductors to the respective kind of electrode. Each frame is furthermore provided with two holes 8 for inlet and two holes 9 for discharge of electrolyte. In the illustrated case, the electrolyte is fed to the cathodes 1 via the right hand hole 8 while it is fed to the anodes 2 via the left hand hole 8. The arrow drawn in full thus represents the electrolyte flow to and from the cathodes while the arrow drawn with a dashed line represents the corresponding flow to and from the anodes.

On either sides of each cathode 1 and each anode 2 there is a separator net 10 of the same configuration as the central opening of the respective electrode. This net 10 is surrounded by a gasket 11 of an elastic material, said gasket enabling regulation of the packing density for the particles of the conductive material.

In the illustrated embodiment the electrode chamber unit also includes an ion-selective diaphragm 12 arranged between two separators 10.

As will be seen from the Figure, the gaskets 11 and diaphragm 12 are also provided with electrolyte passage holes in register with the holes 8 and 9, respectively, in the electrodes.

The cell from FIG. 1 is illustrated in FIG. 2 in an assembled state, additional illustrated details being end plates 13, e.g. of metal, with inlet holes 14 and outlet holes (not visible) for electrolyte, rods 15 and nuts 16 for clamping the cell together in an assembled condition. As is clear from the above description, the end plates 13 are called separators for the sake of simplicity and for the purpose of the invention, although they have a different structure and partially another function than the separators 10.

FIG. 3 illustrates an embodiment of a current supplier for the electrodes in accordance with the invention, more specifically an expanded metal net 17 with rod-like elements 18. This embodiment of the current supplier is the one illustrated in FIG. 1, where the net thus has reference numeral 6 and the rods the numeral 7. In this case the net is of substantially the same shape as the central opening 4 in the frame 3.

FIG. 4 illustrates another variation of the current supplier with a considerably smaller tongue 19 having rod-like elements 20 connected thereto, i.e. the tongue is intended to occupy only a portion of the central opening in the frame.

EXAMPLES

The invention is finally illustrated by the following non-restricting working examples.

Experimental Procedure

The experiments were carried out while varying the following parameters: input concentration, kind of metal ion, flow rate, graphite grain size and electrolyte resistivity. Most of the experiments were carried out with a single particulate electrode of the type described, closed in on either side by an anion-selective diaphragm (Selemion ASV from Asahi Glass, Japan) and counter electrodes of lead plates. A polypropylene net was also applied as a separator between the lead electrodes and the diaphragms. Experiments were also carried out with several particulate electrodes (four, every second cathodic and every second anodic) according to FIG. 1.

The feed solution was stored at room temperature in a polyethylene container having a volume of 60 liters. The solution was pumped into the cell by a centrifugal pump via a calibrated flow meter (rotameter). The flow rate was regulated by a valve on the pump pressure side. The metal concentrations in the feed solution and the discharge solution were determined with the aid of an atom absorption spectrophotometer (Varion AA-275). The pH of said feed and discharge solutions were measured with a glass electrode.

The recirculating anode solution was a 0.1M $K_2SO_4$ solution. The anode reaction was a generation of oxygen.

The solution was allowed to pass through the particulate bed in a single pass.

Results

Copper Precipitation

Experiments were made with both synthetic solutions made up from $K_2SO_4$ (0.1–0.5M) solutions and $CuSO_4$ to the desired concentration, and authentic waste solutions from the surface finishing industry.

The results are apparent from Table 1 below.

TABLE 1

| c (mg/l) | $c_{out}$ (mg/l) | pH | $d_p$ (mm) | $\rho$ ($\Omega$m) | q (l/min) | I (A) | U (V) |
| --- | --- | --- | --- | --- | --- | --- | --- |
| 67 | 0.03 | 1.4 | 1.0–1.4 | 0.30 | 2.16 | 14 | 2.22 |
| 53.7 | 0.66 | 2.62 | 2.0–3.15 | 0.23 | 2.0 | 13 | 2.6 |
| 35.5 | 0.73 | 2.87 | " | " | 4.0 | 18 | — |
| 230* | 0.03 | 0.87 | 0.7–1.4 | 0.18 | 1.0 | 24 | 1.85 |

*Waste solution from pickling of copper from a surface treatment plant.

Zinc Precipitation

Due to the very non-precious nature of zinc (electrode potential = −0.76 V relative to a hydrogen gas electrode) an electrochemical precipitation of zinc is very difficult. A series of experiments with different pH:s were carried out. The results are presented in Table 2:

TABLE 2

| $c_{in}$ | $pH_{in}$ | $c_{out}$ | $pH_{out}$ | q | I |
| --- | --- | --- | --- | --- | --- |
| 60 | 5.75 | 3.3–5 | 12.1 | 1.0 | 20 |
| 62 | 4.2 | 3.5–5.5 | 11.9 | " | " |
| 70 | 2.8 | ~4.6 | 11.5 | " | " |
| 64 | 2.05 | 54 | 2.25 | " | " |
| 76 | 2.4 | 65 | 2.75 | " | " |

As expected, the purification effect was not as good as for copper. The higher the pH value the better is the purification.

The effect of the resistivity

With very dilute solutions the electrolyte resistivity can be very low. A trial series was therefore carried out with varying contents of supporting electrolyte in the precipitation of copper.

The results are accounted for in Table 3 ($d_p$ = 1.2 mm).

TABLE 3

| $c_{in}$ | $\rho_{in}$ [$\Omega$m] | $\rho_{out}$ [$\Omega$] | $c_{out}$ | q (l/min) | I (A) | I (V) |
| --- | --- | --- | --- | --- | --- | --- |
| 116 | 3.38 | 3.85 | 28 | 2 | 9 | 2.15 |
| 90 | 10 | 21.1 | 7 | 1 | 9 | 2.67 |
| 74 | 5.35 | 10.6 | 0.6 | 1 | 7 | 3.24 |

Experiments were also made with a complete cell consisting of two particulate anodes and two particulate cathodes; see FIG. 1. The same experimental procedure was used as above. The experiments embraced copper precipitation only. The results corresponded substantially to those in TABLE 1.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

We claim:

1. An electrode chamber unit which is intended for use in an electrochemical cell including at least one porous percolation electrode in the form of a bed of electrically conductive particles and which includes at least one thin, substantially flat frame, which frame defines a central opening that is filled with the electrically conductive particles so that these form a porous bed, the particles being kept in place in the central opening of the frame by sufficiently dense separators which are arranged to cover the central opening on either side of the frame to form an electrode chamber of substantially the same thinness as the frame, the frame provided with means for supplying electric current to the conductive particles, and the frame provided with at least one hole for supplying and at least one hole for discharging electrolyte, said holes being in communication via inlet and outlet channels respectively with the central opening of the frame so that electric current and electrolyte flow are directed in a cross-flow pattern in relation to each other, said electric current supplying means including an electrode element in electrical contact with said porous bed and located within said electrode chamber so that as electrolyte flows through said electrode chamber, said electrode element is wholly immersed.

2. An electrode chamber unit as claimed in claim 1 wherein the frame is enclosed on either side by a gasket of an elastic material which enables an adjustment of the packing density for the particles of the conductive material.

3. An electrode chamber unit as claimed in claim 2, wherein the central opening has a substantially rectangular shape where the ratio of longside:shortside of the rectangle is at least 2:1, preferably at least 4:1 and particularly 4:1–10:1, and wherein the channels for supply and discharge respectively of the electrolyte open out in respective shortsides of the rectangle.

4. An electrode chamber unit as claimed in claim 2 which includes an ion-selective diaphram arranged between two separators being of a net or fabric material which is sufficiently dense to prevent the conductive particles from puncturing the diaphragm but not so dense as to disturb the electrolytic flow.

5. An electrode chamber unit as claimed in claim 2, wherein the current conductor comprises a substantially flat tongue arranged in the bed of conductive particles with a space to the edge of the central opening, the tongue being connectable to a current source via rod-like elements projecting in through the peripheral edge on the frame.

6. An electrode chamber unit as claimed in claim 2, wherein the current conductor consists of a metal net with rod-like elements for connection to a current source.

7. An electrode chamber unit as claimed in claim 1, wherein the central opening has a substantially rectangular shape where the ratio of longside:shortside of the rectangle is at least 2:1, preferably at least 4:1 and particularly 4:1–10:1, and wherein the channels for supply and discharge respectively of the electrolyte open out in respective shortsides of the rectangle.

8. An electrode chamber unit as claimed in claim 1 which includes an ion-selective diaphragm arranged between two separators, the separators being of a net or fabric material which is sufficiently dense to prevent the conductive particles from puncturing the diaphragm but not so dense as to disturb the electrolytic flow.

9. An electrode chamber unit as claimed in claim 1, wherein the electrode element comprises a substantially flat tongue arranged in the bed of conductive particles with a space to the edge of the central opening, the tongue being connectable to a current source via rod-like elements extending through the peripheral edge on the frame.

10. An electrode chamber unit as claimed in claim 9, wherein the electrode element comprises a graphite tongue with rod-like elements of titanium.

11. An electrode chamber unit as claimed in claim 1, wherein the electrode element comprises a metal net with rod-like elements for connection to a current source.

12. An electrode chamber unit as claimed in claim 1, wherein the channels for supplying and discharge of electrolyte respectively contain means for distributing the electrolyte across the entire width of the central opening of the frame, preferably a plurality of smaller channels.

13. An electrode chamber unit as claimed in claim 1, wherein the frame is electrically non conducting and has two holes for supply and two holes for discharge of electrolyte with separate channels to the central opening, the channels opening out on opposite sides of the central opening in a manner such that the frame is usable in an electrode chamber unit of opposite polarity by a simple rotating by 180°, said electric current supplying means including a rod-like element operatively connected to said electrode element and extending through the peripheral edge on the frame.

14. An electrode chamber unit as claimed in claim 1, wherein the frame has a thickness within the range of 0.2–5 cm.

15. An electrochemical cell built up in accordance with the filter press principle with the electrodes arranged in central openings in frames provided with holes for supply and discharge of electrolyte to and from the electrode, respectively, which includes electrode chamber units according to claim 1.

16. An electrochemical cell as claimed in claim 15, wherein a shortside of the central opening is arranged along a horisontal plane.

17. An electrochemical cell as claimed in claim 15, which is constructed solely from said electrode chamber units, the anode frames being rotated 180° in relation to the cathode frames.

18. An electrode chamber unit as claimed in claim 1, wherein said electrode element is arranged in said porous bed and is spaced from each of the separators covering the central opening, whereby electrolyte flow may be adjacent opposite sides of said electrode element.

19. A method of manufacturing an electrochemical cell which comprises at least one porous percolation electrode in the form of a bed of electrically conductive particles and which includes at least one thin, substantially flat, electrically non-conducting frame, which frame defines a central opening that is filled with the electrically conductive particles so that these form a porous bed, the particles being kept in place in the central opening of the frame by sufficiently dense separators which are arranged to cover the central opening on either side of the frame to form an electrode chamber unit of substantially the same thinness as the frame, the frame including current conducting means for supplying electric current to the conductive particles including an electrode element located within the electrode chamber and in electrical contact with said porous bed, and the frame provided with at least one hole for supplying and at least one hole for discharging electrolyte, said holes being in communication via inlet and outlet channels respectively with the central opening of the frame so that electric current and electrolyte flow are directed in a cross-flow pattern in relation to each other, said method comprising the steps of placing a separator horizontally, mounting at least one frame on top of the separator, filling the central opening of the frame with particles of the electrically conductive material, placing the next separator thereupon so as to keep the particles in place, and repeating the procedure with the number of electrode chamber units which are to be included in the electrochemical cell, and locking the units to each other with conventional locking means.

20. The method as claimed in claim 19, which comprises placing gaskets constructed from an elastic material between the frames, and filling the central opening with the conductive particles up to an edge of the gasket and compressing the gaskets to a predetermined packing density of the conductive particles.

21. A method for purifying water comprising the steps of:
providing an electrochemical cell including at least one porous percolation electrode in the form of a bed of electrically conductive particles and which includes at least one thin, substantially flat frame, which frame defines a central opening that is filled with the electrically conductive particles so that these form a porous bed, the particles being kept in place in the central opening of the frame by sufficiently dense separators which are arranged to cover the central opening on either side of the frame to form an electrode chamber of substantially the same thinness as the frame, the frame provided with at least one first hole for supplying and at least one second hole for discharging electrolyte, said holes being in communication via inlet and outlet channels respectively with the central opening of the frame;
supplying a flow water to said first hole; and
during said water supplying step, supplying electric current to an electrode element located within said electrode chamber and in electrical contact with said porous bed so that electric current is supplied to said conductive particles while said electrode element is immersed in the supplied water, said electric current and said water flow being directed in a crossflow pattern in relation to each other.

* * * * *